United States Patent
Fukuzawa et al.

(10) Patent No.: US 8,684,469 B2
(45) Date of Patent: Apr. 1, 2014

(54) VEHICLE SEAT BELT APPARATUS

(75) Inventors: Masaki Fukuzawa, Okazaki (JP); Seiji Naito, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 283 days.

(21) Appl. No.: 13/078,293

(22) Filed: Apr. 1, 2011

(65) Prior Publication Data

US 2011/0241406 A1    Oct. 6, 2011

(30) Foreign Application Priority Data

Apr. 1, 2010    (JP) .................................. 2010-085089

(51) Int. Cl.
*B60R 22/00*    (2006.01)

(52) U.S. Cl.
USPC .......................................... 297/481; 297/468

(58) Field of Classification Search
USPC ............. 297/468, 481, 482; 280/801.1, 801.2
See application file for complete search history.

(56) References Cited

U.S. PATENT DOCUMENTS

| | | | | |
|---|---|---|---|---|
| 3,244,452 A | * | 4/1966 | Veley et al. .................... | 297/481 |
| 4,431,233 A | * | 2/1984 | Ernst .............................. | 297/468 |
| 4,966,393 A | * | 10/1990 | Tokugawa ................... | 280/801.1 |
| 5,318,350 A | * | 6/1994 | Okamoto ....................... | 297/468 |
| 7,347,500 B2 | * | 3/2008 | Clifton, Jr. ..................... | 297/482 |
| 7,383,620 B2 | * | 6/2008 | Smith .............................. | 24/633 |
| 8,087,697 B2 | | 1/2012 | Tanaka et al. | |
| 2008/0048086 A1 | * | 2/2008 | Kojima et al. ................. | 248/429 |
| 2010/0001503 A1 | * | 1/2010 | Tanaka et al. ................. | 280/807 |

FOREIGN PATENT DOCUMENTS

| | | |
|---|---|---|
| CN | 101130356 A | 2/2008 |
| CN | 101516690 A | 8/2009 |
| JP | 59-127652 U | 8/1984 |
| JP | 3-120253 U | 12/1991 |
| JP | 7-35203 U | 6/1995 |
| JP | 2006256532 A | 9/2006 |
| JP | 2008-049893 A | 3/2008 |
| JP | 2008-126880 A | 6/2008 |
| JP | 2009096298 A | 5/2009 |

OTHER PUBLICATIONS

Chinese Offce Action issued on Aug. 27, 2012, in co-pending Chinese Application No. CN201110084621.9, and English language translation thereof.

Office action issued Mar. 27, 2012 from corresponding Japanese Patent Application No. 2010-085089 and English language translation thereof.

* cited by examiner

*Primary Examiner* — Philip Gabler
(74) *Attorney, Agent, or Firm* — Gifford, Krass, Sprinkle, Anderson & Citkowski, P.C.

(57) ABSTRACT

A vehicle seat belt apparatus includes: a webbing; a lap anchor to which one end portion of the webbing is fixed and that is pivotable in a vehicle longitudinal direction; and a position retaining member that allows the webbing to be slidably inserted therethrough, and that is rigid in the vehicle longitudinal direction and is flexible and elastic in a vehicle transverse direction. In a seat belt retracted state, the position retaining member extends obliquely forward and upward from a lower end portion, and an upper end portion is located ahead of a side support of a seat back and above a seat shield.

11 Claims, 10 Drawing Sheets

III – III CROSS SECTION

VII-VII CROSS SECTION

X - X CROSS SECTION

FIG. 11

XI - XI CROSS SECTION

XIII - XIII CROSS SECTION

VEHICLE SEAT BELT APPARATUS

INCORPORATION BY REFERENCE

The disclosure of Japanese Patent Application No. 2010-085089 filed on Apr. 1, 2010 including the specification, drawings and abstract is incorporated herein by reference in its entirety.

BACKGROUND OF THE INVENTION

1. Field of the Invention

The invention relates to a vehicle seat belt apparatus that makes it easy to wear and retract a seat belt and that does not deteriorate the ease of entry/exit or the ability of a lap belt to retrain a hip.

2. Description of Related Art

Figure 15:
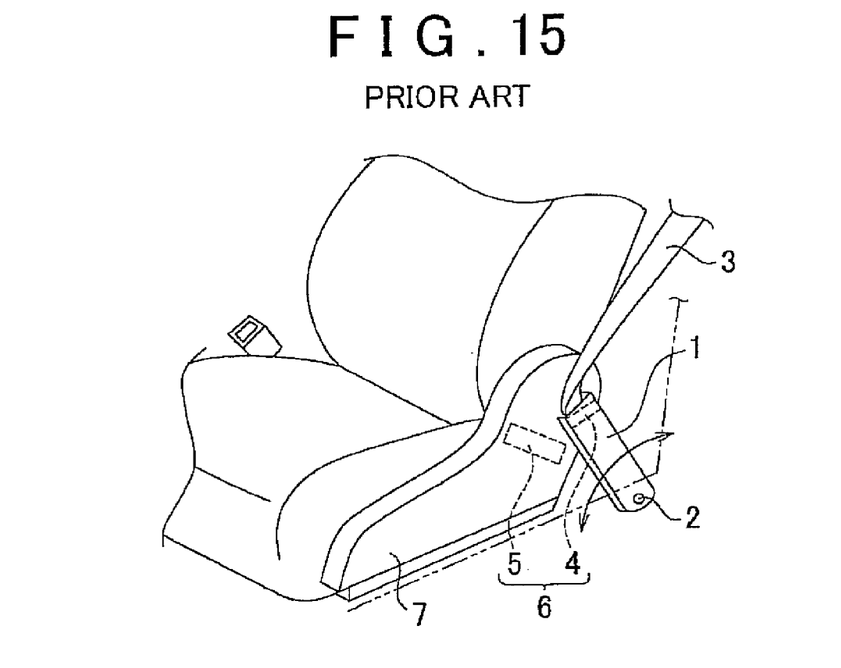
FIG. 15 is a perspective view of the vehicle seat belt apparatus described in JP-A-2006-256532.

Japanese Patent Application Publication No. 2006-256532 (JP-A-2006-256532) describes a seat belt apparatus as shown in FIG. 15. The seat belt apparatus includes a boot member 1 at an outer anchor 2 to wrap the distal end portion of a seat belt 3. The seat belt apparatus includes forward tilting retaining means 6 formed of a magnet 4 and an iron plate 5. The magnet 4 and the iron plate 5 are respectively provided at the boot member 1 and at the lower portion of a seat. The forward tilting retaining means 6 makes it easy to withdraw the seat belt 3 in such a manner that the boot member 1 is retained at a forward tilting position when the boot member 1 is pivoted to the forward tilting position, and releases the boot member 1 when operating force that exceeds the retaining force by which the booth member 1 is retained at the forward tilting position is exerted rearward.

However, the existing seat belt apparatus has the following problems.

(i) Because the boot member 1 is retained by the magnet 4 and the iron plate 5, the seat belt 3 and a tongue plate are not moved to a front position at which an occupant easily holds the seat belt 3 and the tongue plate unless the occupant tilts the boot member 1 forward. In addition, unless the occupant moves the boot member 1 rearward, the seat belt 3 cannot be retracted, and the seat belt cannot be automatically retracted. Thus, there is room for improvement in the wearability and retractability of the seat belt.

(ii) In addition, the seat belt 3 is supported by the rigid resin boot member 1, so the seat belt 3 and the tongue plate cannot be extended forward to a position at which the seat belt 3 and the tongue plate are easily held by hand in such a manner that the boot member 1 is extended to above a seat rigid member 7. If the boot member 1 is extended to above the seat rigid member 7, there is a problem that a gap is formed at the boot member side between the lap belt and the hip to decrease the ability of the lap belt portion to restrain the hip and, in addition, the ease of entry/exit is deteriorated because the boot member 1 lies in the way when the boot member 1 is located at the forward tilting position.

SUMMARY OF THE INVENTION

The invention provides a vehicle seat belt apparatus that makes it easy to wear and retract a seat belt and that does not deteriorate the ease of entry/exit or the ability of a lap belt to retrain a hip.

An aspect of the invention provides a vehicle seat belt apparatus. The vehicle seat belt apparatus includes: a webbing; a lap anchor that is connected to a vehicle member so as to pivot in a vehicle longitudinal direction and to which one end portion of the webbing is fixed; and a position retaining member that is located above the lap anchor, that allows the webbing to be slidably inserted therethrough, and that is rigid in the vehicle longitudinal direction and is flexible and elastic in a vehicle transverse direction. The position retaining member has an upper end portion and a lower end portion, and, in a seat belt retracted state, the position retaining member extends obliquely forward and upward from the lower end portion and the upper end portion is located ahead of a side support of a seat back and above a seat shield.

With the above vehicle seat belt apparatus, in the seat belt retracted state, the position retaining member extends obliquely forward and upward from the lower end portion and the upper end portion is located ahead of the side support of the seat back and above the seat shield, so a tongue plate is placed at an easily reachable location to thereby make it easy to hold the seat belt by hand. In addition, the position retaining member is flexible and elastic in the vehicle transverse direction, so the tongue plate held by hand is easily inserted into a buckle. As the tongue plate is removed from the buckle, the seat belt and the position retaining member automatically return to a retracted position by the pulling force that a retractor pulls the belt, so it is not necessary to manually pivot the boot member in the vehicle longitudinal direction at the time of wearing or retracting the belt, unlike the case described in JP-A-2006-256532. Thus, it is easy to wear or retract the seat belt. In addition, the position retaining member is flexible and elastic in the vehicle transverse direction, so, even when an occupant hits against the position retaining member, the position retaining member elastically deforms to be bent in the vehicle transverse direction and almost does not interfere with entry/exit of the occupant. In addition, the position retaining member is flexible and elastic in the vehicle transverse direction, so the position retaining member itself wraps around the hip when the belt is worn, and no slack of the lap belt is formed.

In the above vehicle seat belt apparatus, the position retaining member may have a first member that is rigid in the vehicle longitudinal direction and is flexible and elastic in the vehicle transverse direction, a second member that covers the first member and that allows the webbing to be slidably inserted therethrough, and a bracket to which a lower end portion of the first member is fixed. The first member may be formed of an inverted U-shaped metal wire, and the inverted U-shaped metal wire may be located in a plane that extends in the vehicle longitudinal direction.

With the above vehicle seat belt apparatus, the position retaining member may have a first member that is rigid in the vehicle longitudinal direction and is flexible and elastic in the vehicle transverse direction, a second member that covers the first member and that allows the webbing to be slidably inserted therethrough, and a bracket to which a lower end portion of the first member is fixed, so the position retaining member and the webbing are slidable with respect to each other and are separate from each other. When the position retaining member is attached to the existing lap anchor and webbing, the vehicle seat belt apparatus according to the aspect of the invention is obtained; whereas, when the position retaining member is removed, the existing lap anchor and webbing are obtained. In addition, the first member is formed of an inverted U-shaped metal wire, and the inverted U-shaped metal wire is located in a plane that extends in the vehicle longitudinal direction, so the metal wire allows the position retaining member to be flexible and elastic in the vehicle transverse direction.

Furthermore, in the above vehicle seat belt apparatus, the second member may be formed of a resin belt-like member that is flexible in the vehicle transverse direction. Alternatively, the second member may be formed of a skin member with a fastener.

In the above vehicle seat belt apparatus, when the second member is formed of a resin belt-like member that is flexible in the vehicle transverse direction, the second member is rigid in the vehicle longitudinal direction so as to be able to maintain the position of the position retaining member, so both the second member and the first member function in order for the position retaining member to take the position in which the position retaining member extends obliquely forward and upward from the lower end portion in the seat belt retracted state. Therefore, the position retaining member may be more rigid in the vehicle longitudinal direction than that when only the first member functions. When the second member is formed of a skin member with a fastener, the position retaining member may be easily removed from the webbing by opening the fastener. Thus, the position retaining member may be removed when the position retaining member is not required, for example, as in the case where a child restraint is fixed.

The above vehicle seat belt apparatus may further include: an urging member that urges the position retaining member toward a vehicle rear side; and a stopper that retains the position retaining member in a position in which the position retaining member extends obliquely forward and upward from the lower end portion in the seat belt retracted state.

With the above vehicle seat belt apparatus, the vehicle seat belt apparatus further includes the urging member that urges the position retaining member toward the vehicle rear side, so the position retaining member may be returned to the retracted position by both the retractor and the urging member, and the position retaining member may be more reliably and quickly returned to the retracted position than the position retaining member is returned to the retracted position only by the pulling force that the retractor pulls the belt. In addition, the stopper is provided, so the position retaining member may be further stably retained in the retracted position in comparison with the case where no stopper is provided.

In the above vehicle seat belt apparatus, the vehicle member to which the lap anchor is connected so as to pivot in the vehicle longitudinal direction may be a seat upper rail. The bracket may be supported by a seat shield cap so as to be displaced in the vehicle longitudinal direction, the seat shield cap being detachably connected to the seat shield so as to cover the bracket.

With the above vehicle seat belt apparatus, when the lap anchor is coupled to the seat upper rail so as to pivot in the vehicle longitudinal direction, the bracket is supported by the seat shield cap so as to be displaced in the vehicle longitudinal direction, so the relative longitudinal displacement between the pivot of the lap anchor and the bracket, which occurs in lift adjustment of a front seat, may be reasonably absorbed by the relative longitudinal displacement between the bracket and the seat shield cap. The relative vertical displacement between the pivot of the lap anchor and the bracket, which occurs in lift adjustment of the front seat, is absorbed by the sliding between the webbing and the position retaining member.

In the above vehicle seat belt apparatus, the vehicle member to which the lap anchor is connected so as to pivot in the vehicle longitudinal direction may be a cushion frame. The lap anchor and the bracket each may be coupled to the cushion frame so as to pivot in the vehicle longitudinal direction.

With the above vehicle seat belt apparatus, when the lap anchor is coupled to the cushion frame so as to pivot in the vehicle longitudinal direction, the bracket is supported by the cushion frame so as to pivot in the vehicle longitudinal direction, so neither the relative longitudinal displacement nor the relative vertical displacement occurs between the pivot of the lap anchor and the bracket in seat lift adjustment, and the bracket and the lap anchor may be supported on the same axis. Thus, the support structure may be simplified.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A seat belt apparatus according to a first embodiment of the invention will be described with reference to FIG. 1 to FIG. 11 and FIG. 14. In the drawings, FR indicates a vehicle front side.

First, the configuration of the seat belt apparatus according to the first embodiment of the invention will be described. The vehicle seat belt apparatus 10 according to the first embodiment of the invention includes a webbing 11, a lap anchor 12 and a position retaining member 20. One end portion of the webbing 11 is fixed to the lap anchor 12. The position retaining member 20 is located immediately above the lap anchor 12. The webbing 11 is slidably inserted through the position retaining member 20. The position retaining member 20 is rigid in a vehicle longitudinal direction and is flexible and elastic in a vehicle transverse direction. The lap anchor 12 is connected to a vehicle member so as to be pivotable in the vehicle longitudinal direction. The vehicle member is formed of a seat upper rail 55 or a cushion frame 54.

The webbing 11 may be the same one as the webbing of an existing three-point seat belt. The webbing 11 is slidably inserted through a shoulder anchor 13. The other end portion of the webbing is coupled to a retractor (not shown) that is arranged on the back surface side of a pillar garnish of a B pillar.

The position retaining member 20 has an upper end portion 21 and a lower end portion 22. In a seat belt retracted state, that is a state where a seat belt is retracted, the position retaining member 20 extends obliquely forward and upward from the lower end portion 22 and the upper end portion 21 is located ahead of a side support 52 of a seat back 51 and above a seat shield 60. The position retaining member 20 just needs to be rigid in the vehicle longitudinal direction so as to be able to maintain the position in which the position retaining member 20 extends obliquely forward and upward from the lower end portion 22 in the seat belt retracted state. The position retaining member 20 just needs to be flexible in the vehicle transverse direction so as to be able to wrap around the hip of an occupant when the seat belt is worn. The position retaining member 20 just needs to be elastic in the vehicle transverse direction so that the position retaining member 20 wrapped around the hip when the seat belt is worn is able to automatically return to the position in which the position retaining member 20 extends obliquely forward and upward from the lower end portion 22 when the seat belt is released.

Because a tongue plate stopper (not shown) is provided at a portion of the webbing 11 immediately above the upper end portion 21 of the position retaining member 20, a tongue plate 14 is located immediately above the upper end portion 21 of the position retaining member 20 in the seat belt retracted state. Thus, in the seat belt retracted state, the tongue plate 14, as well as the upper end portion 21 of the position retaining member 20, is located ahead of the side support 52 of the seat back 51 and above the seat shield 60.

Figure 1:
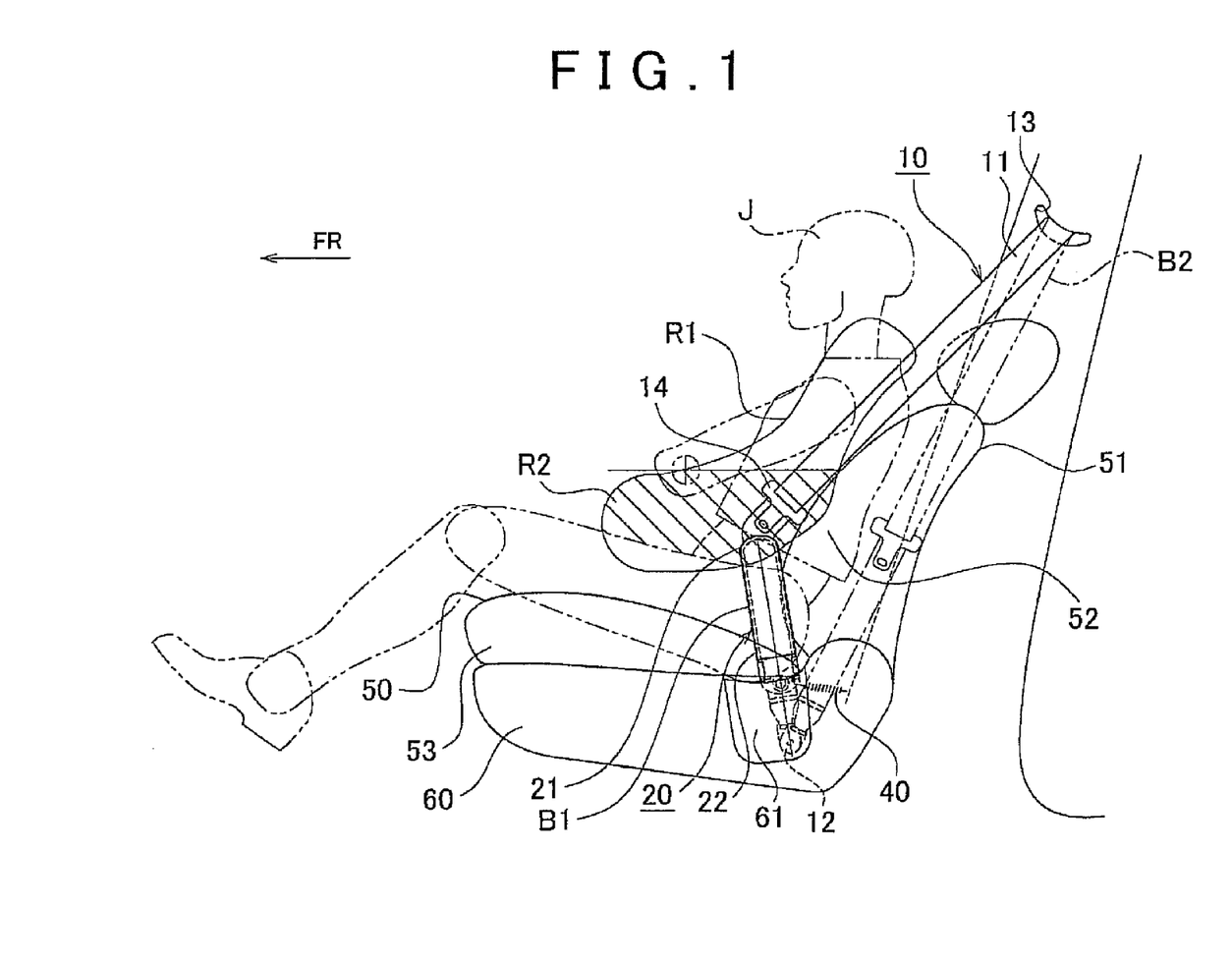
FIG. 1 is a side view of a vehicle seat belt apparatus according to first and second embodiments of the invention in a seat belt retracted state.

In FIG. 1, R1 indicates a region that the inner hand of the occupant is reachable, and R2 indicates a region that the position of the arm of the occupant on an armrest is located below the arm rest and is located on or above the upper surface of the thigh of the occupant. The region R2 is a region that is easily reachable by the inner hand of the occupant within the region R1. The length of the position retaining member 20 and the forward tilting position of the position retaining member 20 in the seat belt retracted state are desirably determined so that the upper end portion 21 of the position retaining member 20 and the tongue plate 14 in the seat belt retracted state are located within the region R1 and, more desirably, within the region R2.

In FIG. 1, B1 indicated by the solid line indicates a webbing position in the seat belt retracted state in the present embodiment of the invention, and B2 indicated by the alternate long and two short dashes line indicates a webbing position of the existing three-point seat belt in the seat belt retracted state.

The position retaining member 20 has a first member 23, a second member 24 and a bracket 25. The first member 23 is rigid in the vehicle longitudinal direction and is flexible and elastic in the vehicle transverse direction. The second member 24 covers the first member 23 and allows the webbing 11 to be slidably inserted therethrough. The lower end portion of the first member 23 is fixed to the bracket 25. The lower end portion of the first member 23 is fixed to the bracket 25 by crimping or welding. FIG. 2 to FIG. 8 show the cases where the lower end portion of the first member 23 is fixed to the bracket 25 by crimping. The reference numeral 26 denotes crimped portions of the bracket 25.

The first member 23 is, for example, formed of an elastic metal wire 23A that has an inverted U shape (U shape when viewed upside down). The inverted U-shaped metal wire 23A is located in a plane that extends in the vehicle longitudinal direction. With the above structure, the inverted U-shaped metal wire 23A is rigid in the vehicle longitudinal direction and is flexible and elastic in the vehicle transverse direction. Metal tape (not shown) may be used for the first member 23 instead of the inverted U-shaped metal wire 23A. The tape width direction of the metal tape is oriented in the vehicle longitudinal direction, and the metal tape is elastic in the vehicle transverse direction. The first member 23 may be formed of a narrow long metal member of which the longitudinal direction is oriented in a plane that extends in the vehicle longitudinal direction. For example, a single or a plurality of linear wires may be arranged in a plane that extends in the vehicle longitudinal direction to serve as the first member. In addition, the first member 23 may be arranged so that the longitudinal direction of the first member 23 is oriented along the webbing 11.

Figure 6:
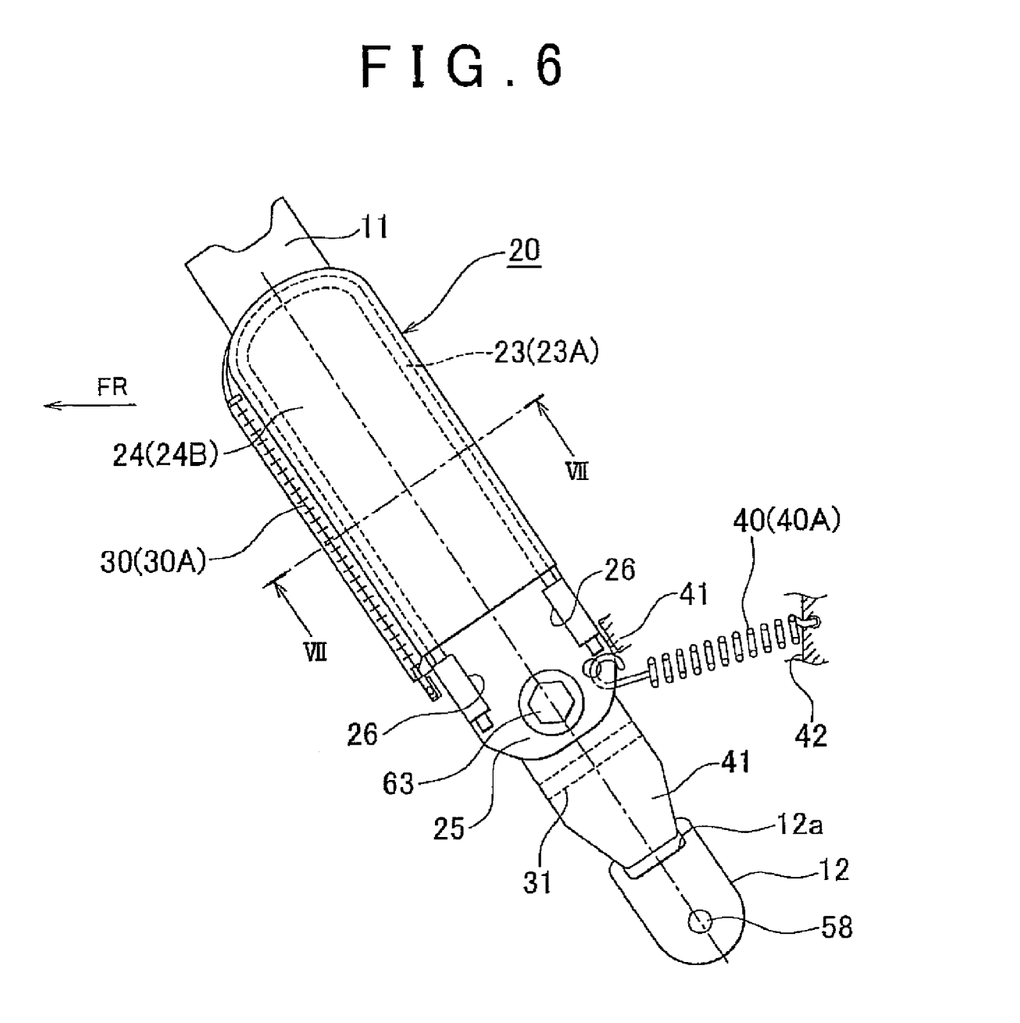
FIG. 6 is an enlarged side view of a portion around the position retaining member, lap anchor and webbing of the vehicle seat belt apparatus according to the first embodiment of the invention when the second member of the position retaining member is formed of a skin member.
Figure 7:
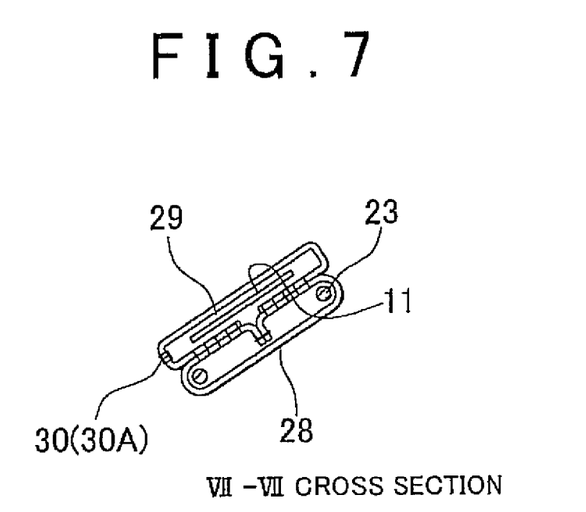
FIG. 7 is an enlarged cross-sectional view of the position retaining member and webbing, which is taken along the line VII-VII in FIG. 6.
Figure 8:
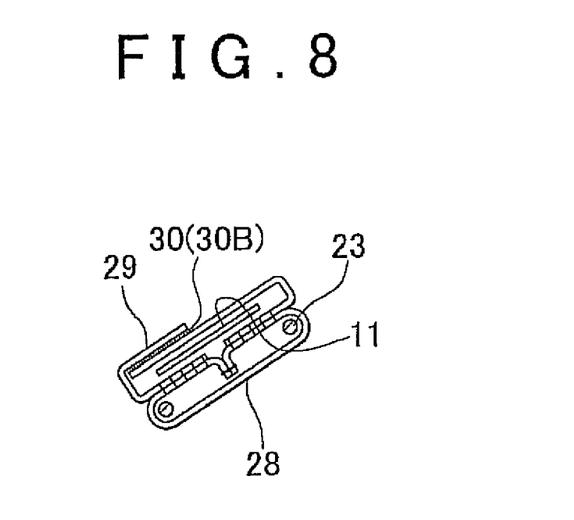
FIG. 8 is an enlarged cross-sectional view of the position retaining member and webbing, which is taken along the line VII-VII in FIG. 6, according to another example different from FIG. 7.

The second member 24 is formed of a resin belt-like member 24A that is flexible in the vehicle transverse direction as shown in FIG. 2 to FIG. 5 or is formed of a skin member 24B with a fastener as shown in FIG. 6 to FIG. 8.

When the second member 24 is the resin belt-like member 24A, the first member 23 is covered with the resin belt-like member 24A and is buried in the resin belt-like member 24A as shown in FIG. 2 to FIG. 5. In addition, one end portion of the bracket 25 is also buried in the resin belt-like member 24A. The resin belt-like member 24A has a webbing insertion hole 27 that extends in the longitudinal direction of the resin belt-like member 24A. The webbing 11 is slidably inserted through the webbing insertion hole 27. By so doing, the webbing 11 is slidable with respect to the position retaining member 20.

When the second member 24 is the skin member 24B with a fastener, the first member 23 is covered with the skin member 24B. The skin of the skin member 24B is formed of any one of or a combination of two or more of cloth, cotton, tetrafluoroethylene fabric, synthetic leather, genuine leather, and the like.

The skin member 24B has a first retaining portion 28 and a second retaining portion 29. The first retaining portion 28 retains the first member 23. The second retaining portion 29 slidably retains the webbing 11. The first retaining portion 28 and the second retaining portion 29 are sewed to each other at their facing surfaces. The second retaining portion 29 has a fastener 30. The skin member 24B and the webbing 11 may be separated from each other by opening the fastener 30. The fastener 30 just needs to be able to open or close the second retaining portion 29. FIG. 7 shows the case where the fastener 30 is formed of a zip fastener 30A. FIG. 8 shows the case where the fastener 30 is formed of a hook and loop fastener 3013.

Figure 2:
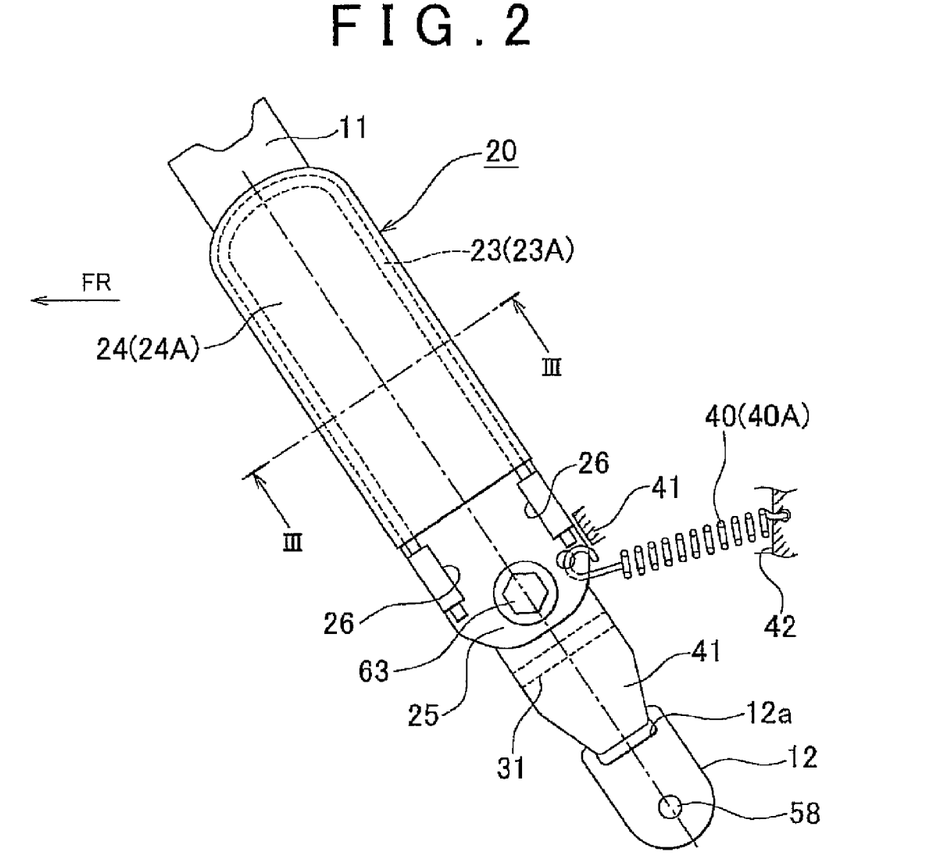
FIG. 2 is an enlarged side view of a portion around a position retaining member, a lap anchor and a webbing of the vehicle seat belt apparatus according to the first embodiment of the invention when a second member of the position retaining member is formed of a resin member.
Figure 3:
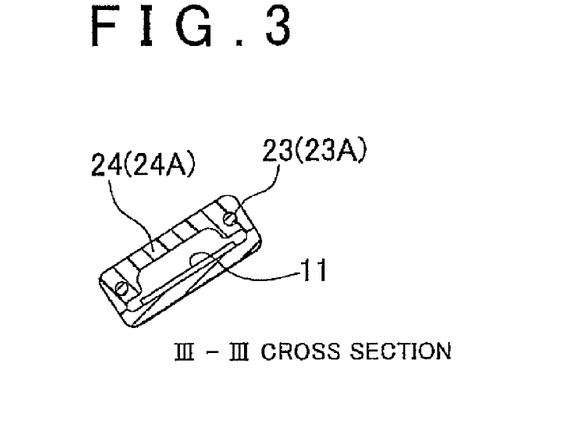
FIG. 3 is an enlarged cross-sectional view of the position retaining member and webbing, which is taken along the line in FIG. 2.
Figure 4:
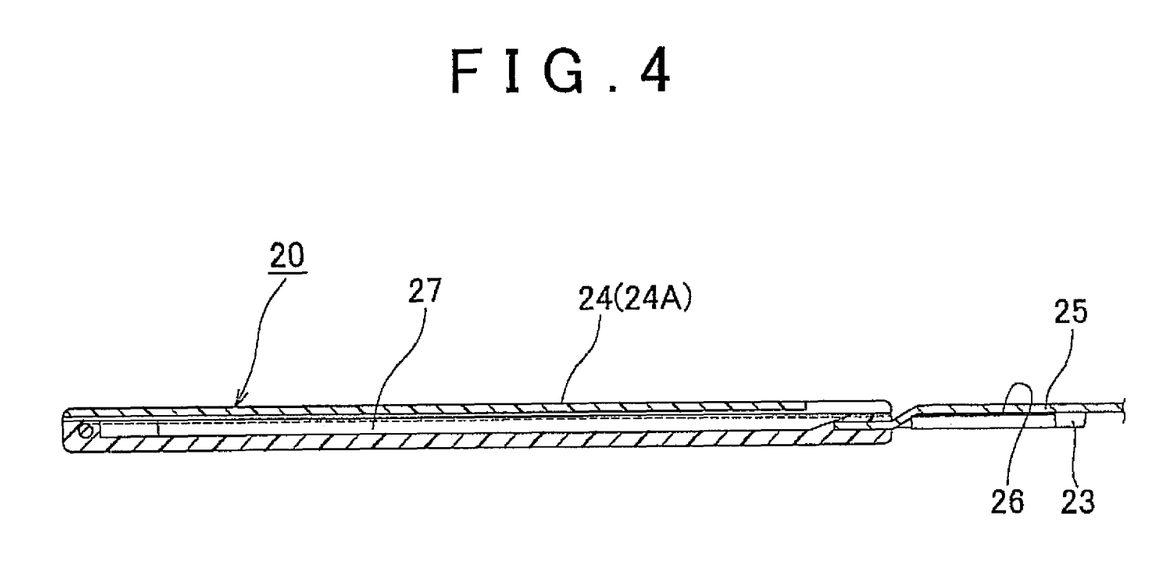
FIG. 4 is a longitudinal cross-sectional view of the position retaining member of FIG. 2.
Figure 5:
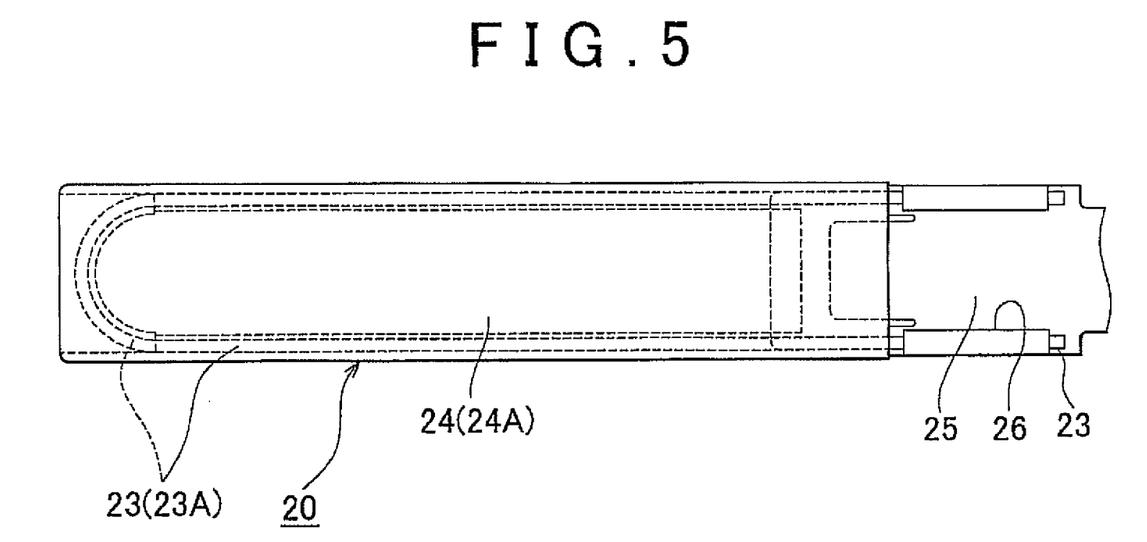
FIG. 5 is a plan view of the position retaining member of FIG. 4.
Figure 13:
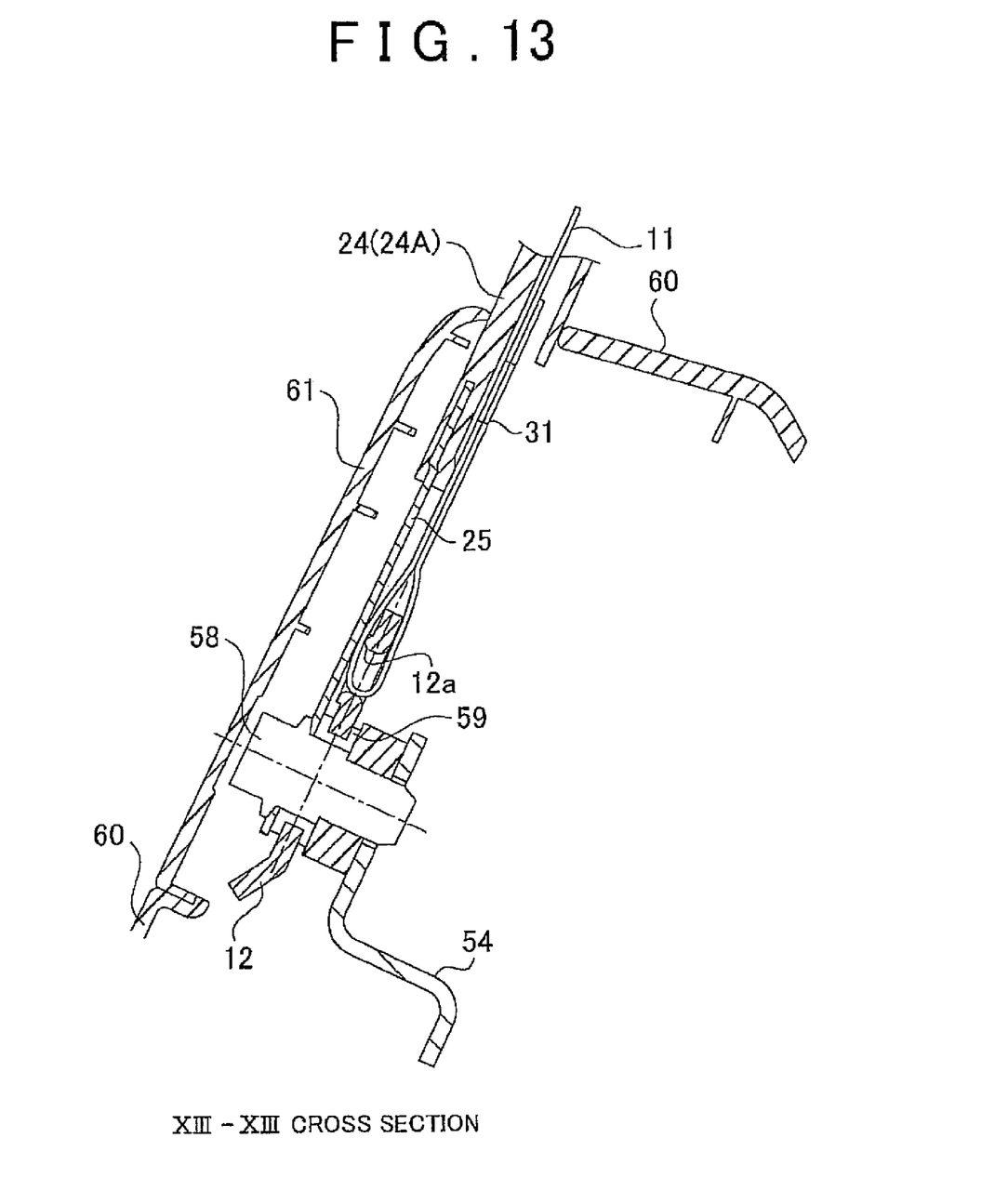
FIG. 13 is an enlarged cross-sectional view of the vehicle seat belt apparatus, which is taken along the line in FIG. 12.

As shown in FIGS. 2, 6 and 13, the webbing 11 is fixed to the lap anchor 12. That is, the webbing 11, which is inserted through the second member 24 to extend downward, is inserted through a hole 12a of the lap anchor 12, and is folded back, and then the folded portion and the unfolded portion are sewed to each other below the bracket 25. The reference numeral 31 denotes a sewed portion.

As shown in FIG. 1 and FIG. 2, the vehicle seat belt apparatus 10 includes an urging member 40 that urges the position retaining member 20 toward a vehicle rear side. In addition, as shown in FIG. 2, the vehicle seat belt apparatus 10 includes a stopper 41 that retains the position retaining member 20 in a position in which the position retaining member 20 extends obliquely forward and upward from the lower end portion in the seat belt retracted state. FIG. 1 and FIG. 2 show the case where the urging member 40 is formed of a spring 40A that is spanned between a body-side fixing member 42 and the bracket 25. However, the urging member 40 may utilize the component of force toward the vehicle rear side out of the pulling force that the retractor pulls the webbing without providing a spring. The above described configuration commonly applies to all the embodiments of the invention.

The first embodiment of the invention further includes the following configuration. In the first embodiment of the invention, the lap anchor 12 is coupled to one of a pair of upper rails 55 of a front seat 50 so as to be pivotable in the vehicle longitudinal direction. The reference numeral 58 denotes a bolt fixed to the upper rail 55. The lap anchor 12 is pivotable around the bolt 58. The bolt 58 constitutes the pivot axis (denoted by the reference numeral 58 because the pivot axis is the bolt) of the lap anchor 12.

Figure 14:
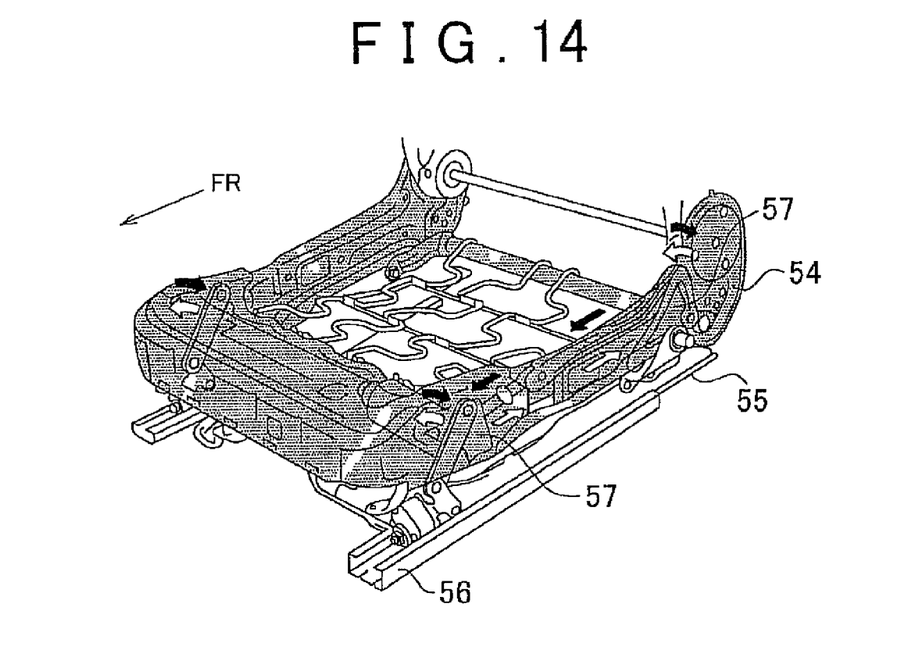
FIG. 14 is a perspective view of a front seat.

As shown in FIG. 1 and FIG. 14, in the front seat 50, in order to allow the longitudinal position of the front seat 50 to be adjustable, the upper rails 55 are slidable in the vehicle longitudinal direction with respect to lower rails 56 fixed to the vehicle. In addition, in order to allow the vertical position of the front seat 50 to be adjustable, the cushion frame 54 and a seat cushion 53 are displaceable in the vertical direction with respect to the upper rails 55 by a lifter. The lifter includes a link 57 that pivots within a plane in the vehicle longitudinal direction, so lift adjustment of the front seat 50 is attended with the longitudinal displacement of the cushion frame 54 and the seat cushion 53 with respect to the upper rails 55.

In order to suppress the upward displacement of the position retaining member 20 with respect to the cushion frame 54, it is desirable that the bracket 25 is coupled to the cushion frame 54. However, when the lap anchor 12 is coupled to one of the upper rails 55, because the cushion frame 54 is displaced vertically and longitudinally with respect to the upper rails 55 in the lift adjustment of the seat 50, the pivot of the bracket 25 deviates from the center line F (FIG. 9) of the position retaining member 20 and webbing 11, which extends obliquely forward and upward from the pivot 58 of the lap anchor 12, in the seat belt retracted state B1, and an unreasonable load is exerted on the position retaining member 20 and the webbing 11 in a direction perpendicular to the center line F to thereby deform the webbing 11.

Figure 9:
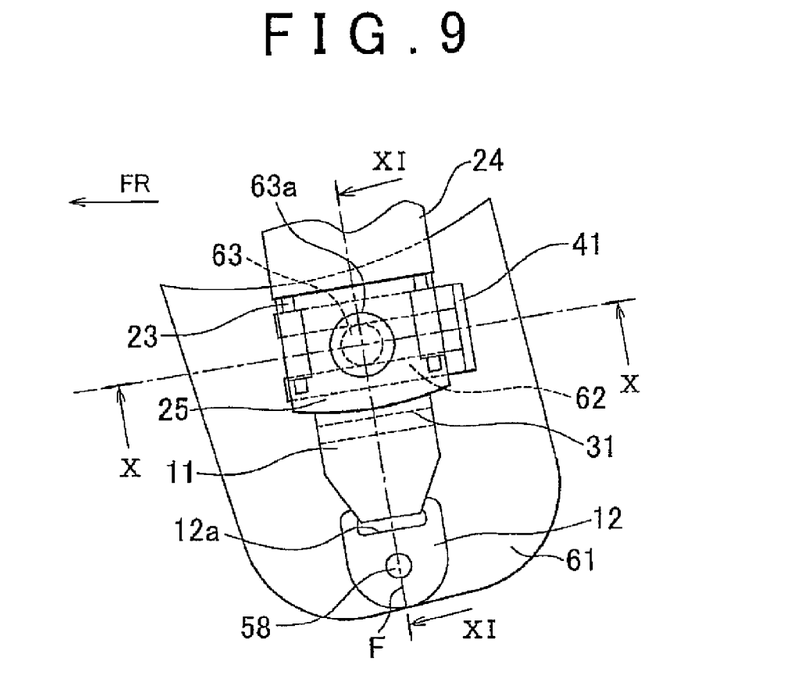
FIG. 9 is an enlarged side view of a portion of a bracket, supported by a seat shield cap, and a portion of the lap anchor, coupled to an upper rail, of the vehicle seat belt apparatus according to the first embodiment of the invention.
Figure 10:
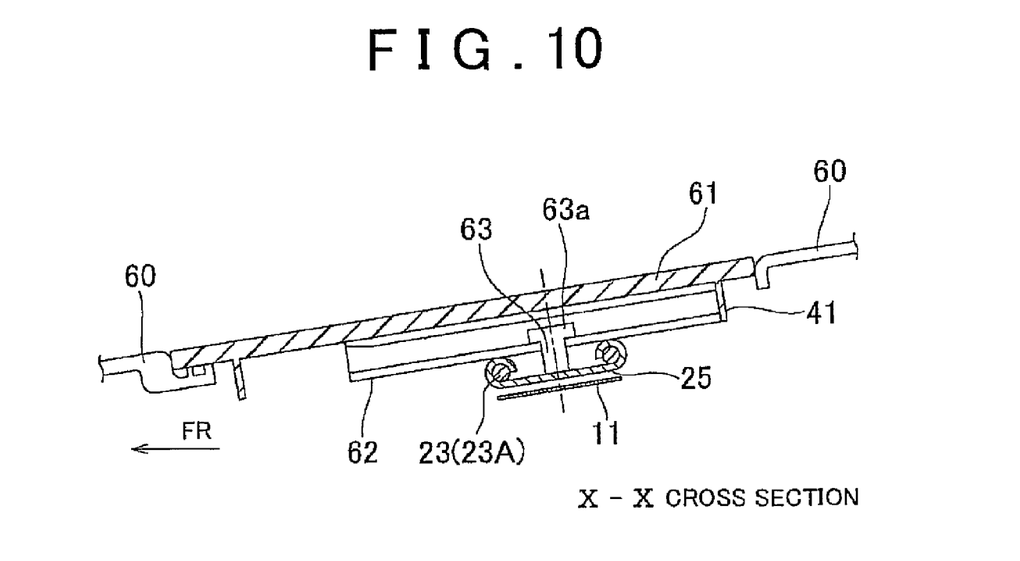
FIG. 10 is an enlarged cross-sectional view of the vehicle seat belt apparatus, which is taken along the line X-X in FIG. 9.
Figure 11:
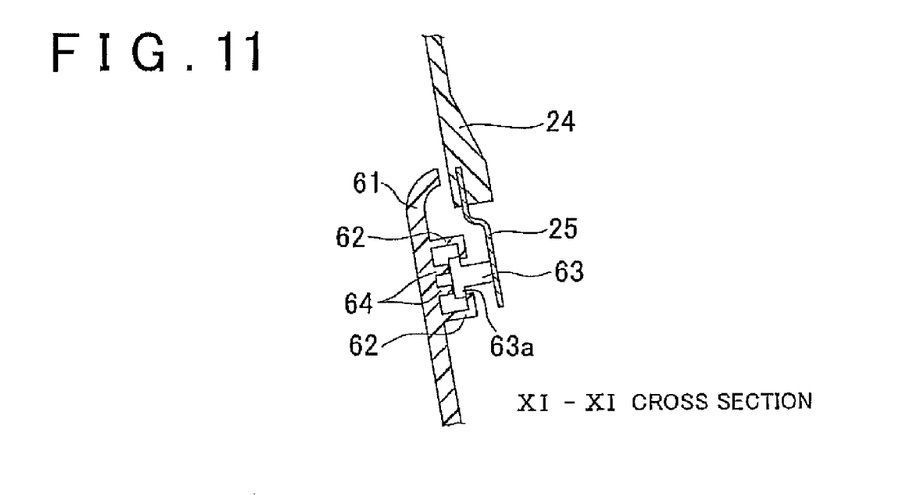
FIG. 11 is an enlarged cross-sectional view of the vehicle seat belt apparatus of FIG. 9, which is taken along the line XI-XI in FIG. 9.

In order to prevent the unreasonable load, when the lap anchor 12 is pivotably coupled to one of the upper rails 55, the bracket 25 is supported by a seat shield cap 61 so as to be displaceable in the vehicle longitudinal direction, as shown in FIG. 9 to FIG. 11. By so doing, the longitudinal displacement of the bracket 25 with respect to the upper rails 55 when the cushion frame 54 and the seat cushion 53 are lifted is absorbed by the longitudinal displacement of the bracket 25 with respect to the seat shield cap 61, and the vertical displacement of the bracket 25 with respect to the upper rails 55 is absorbed by the sliding of the webbing 11 with respect to the position retaining member 20. As a result, the center line F of the position retaining member 20 and webbing 11 passes through the pivot 58 of the lap anchor 12, and a load on the position retaining member 20 and the webbing 11 in a direction perpendicular to the center line F is suppressed.

FIG. 9 to FIG. 11 show a structure that the bracket 25 is supported by the seat shield cap 61 so as to be displaceable in the vehicle longitudinal direction. The seat shield cap 61 is inserted into a cutout portion of the seat shield 60 from above and is connected to the seat shield 60. The seat shield 60 and the seat shield cap 61 both are made of resin.

The seat shield cap 61 has a pair of upper and lower cap slide rails 62 that extend in the vehicle longitudinal direction. The head portion 63a of a stud pin 63 fixed to the bracket 25 is inserted in between the pair of rails 62. The head portion 63a of the stud pin 63 is slidable in the vehicle longitudinal direction along the rails 62.

As shown in FIG. 10, a stopper 41 is provided at the rear end of the rails 62. As the head portion 63a of the stud pin 63 is displaced rearward to contact the stopper 41, the bracket 25 cannot be further displaced toward the vehicle rear side. By so doing, the stopper 41 (FIG. 10) functions as the stopper 41 (FIG. 2) that retains the position retaining member 20 in the position in which the position retaining member 20 extends obliquely forward and upward from the lower end portion in the seat belt retracted state. As shown in FIG. 11, rattle suppression ribs 64 are formed between the pair of rails 62 of the seat shield cap 61 so as to protrude toward the head portion 63a of the stud pin 63. The rattle suppression ribs 64 suppress a rattle of the stud pin 63 in the vehicle transverse direction.

Next, the operations and advantageous effects of the vehicle seat belt apparatus according to the first embodiment of the invention will be described. In the vehicle seat belt apparatus 10, the position retaining member 20 extends obliquely forward and upward from the lower end portion 22 and the upper end portion 21 is located ahead of the side support 52 of the seat back 51 and above the seat shield 60 in the seat belt retracted state B1, so the tongue plate 14 is placed in the easily reachable region R1, particularly, in the region R2 to thereby make it easy to hold the tongue plate 14 and the webbing 11 by hand. In addition, the first member 23 and second member 24 of the position retaining member 20 are flexible and elastic in the vehicle transverse direction, so the tongue plate 14 held by hand is easily inserted into the buckle while the position retaining member 20 is bent ahead of the hip.

As the tongue plate 14 is removed from the buckle, the seat belt and the position retaining member 20 automatically return to the retracted position HI by the urging force of the urging member (spring) 40, the pulling force that the retractor pulls the belt, or the sum of the urging force of the urging member 40 and the pulling force of the retractor, so it is not necessary to manually pivot the boot member in the vehicle longitudinal direction at the time of wearing or retracting the belt, unlike the case described in JP-A-2006-256532. Thus, it is easy to wear or retract the seat belt.

In addition, the position retaining member 20 is flexible and elastic in the vehicle transverse direction, so, even when an occupant J hits against the position retaining member 20, the position retaining member elastically deforms to be bent in the vehicle transverse direction and almost does not interfere with entry/exit of the occupant J. In addition, the position retaining member 20 is flexible and elastic in the vehicle transverse direction, so the position retaining member 20 itself is curved in the vehicle transverse direction to wrap around the hip of the occupant when the belt is worn, and no slack of the lap belt is formed unlike the case of a rigid position retaining member.

The position retaining member 20 has the first member 23 that is rigid in the vehicle longitudinal direction and is flexible and elastic in the vehicle transverse direction, the second member 24 that covers the first member 23 and that allows the webbing 11 to be slidably inserted therethrough, and the bracket 25 to which the lower end portion of the first member is fixed. In this case, the position retaining member 20 and the webbing 11 are slidable with respect to each other and are separate from each other. When the position retaining member 20 is attached to the existing lap anchor and webbing, the vehicle seat belt apparatus 10 according to the embodiment of the invention is obtained; whereas, when the position retaining member 20 is removed, the existing lap anchor and webbing are obtained.

When the first member 23 is formed of the inverted U-shaped metal wire 23A and the inverted U-shaped metal wire 23A is located in a plane that extends in the vehicle longitudinal direction, the metal wire 23A allows the position retaining member 20 to be flexible and elastic in the vehicle transverse direction, and allows the position retaining member 20 to be more rigid in bending in the vehicle longitudinal direction than in the vehicle transverse direction.

When the second member 24 is formed of the resin belt-like member 24A, the directions of the short sides of the flattened rectangular cross section of the resin belt-like member 24A are oriented in the vehicle transverse direction to make the second member 24 be flexible in the vehicle transverse direction, while the directions of the long sides of the rectangular cross section of the resin belt-like member 24A are oriented in the vehicle longitudinal direction to make the second member 24 be more rigid in the vehicle longitudinal direction than in the vehicle transverse direction, so the second member 24 also effectively functions in order for the position retaining member 20 to take the position in which the position retaining member 20 extends obliquely forward and upward from the lower end portion 22 in the seat belt retracted state B1. Thus, the position retaining member 20 may be more rigid in the vehicle longitudinal direction than that when only the first member 23 functions.

When the second member 24 is formed of the skin member 24B with a fastener, the position retaining member 20 may be easily removed from the webbing 11 by opening the fastener 30. Thus, the position retaining member 20 may be easily removed when the position retaining member 20 is not required, for example, as in the case where a child restraint is fixed.

When the vehicle seat belt apparatus further includes the urging member 40 that urges the position retaining member toward the vehicle rear side, the position retaining member may be returned to the refracted position B1 by both the retractor and the urging member 40, so the position retaining member 20 may be returned to the retracted position B1 more reliably and more quickly than the position retaining member 20 is returned to the retracted position only by the pulling force that the retractor pulls the belt. In addition, the stopper 41 is provided, so the position retaining member 20 may be further stably retained in the retracted position B1. The above operations and advantageous effects apply to the vehicle seat belt apparatuses according to all the embodiments of the invention.

The first embodiment of the invention further has the following operation and advantageous effect. When the lap anchor 12 is coupled to one of the seat upper rails 55 so as to be pivotable in the vehicle longitudinal direction, the bracket 25 is supported by the seat shield cap 61 so as to be displaceable in the vehicle longitudinal direction, so the relative longitudinal displacement between the pivot 58 of the lap anchor 12 and the bracket 25, which occurs in lift adjustment of the front seat 50, may be reasonably absorbed by the relative longitudinal displacement between the bracket 25 and the seat shield cap 61, and the center line F of the position retaining member 20 and webbing 11 is allowed to pass through the pivot 58 of the lap anchor 12. Note that the relative vertical displacement between the pivot 58 of the lap anchor 12 and the bracket 25, which occurs in lift adjustment of the front seat 50, is automatically absorbed by the sliding between the webbing 11 and the position retaining member 20.

Next, a seat belt apparatus according to a second embodiment of the invention will be described with reference to FIG. 1 to FIG. 8 and FIG. 12 to FIG. 14. In the drawings, FR indicates the vehicle front side. The portion of the above description of the first embodiment of the invention, which is applicable to all the embodiments of the invention, applies to the second embodiment of the invention. The second embodiment of the invention, other than the portion applicable to all the embodiments of the invention, will be described.

First, the configuration of the seat belt apparatus 10 according to the second embodiment of the invention will be described. In the seat belt apparatus 10 according to the second embodiment of the invention, the lap anchor 12 and the bracket 25 are coupled to the cushion frame 54 of the front seat 50 so as to be pivotable around the same axis in the vehicle longitudinal direction. Because the lap anchor 12 and the bracket 25 are coupled to the same member (cushion frame 54), the pivot axis 58 of the lap anchor 12 and the bracket 25 do not deviate from each other in the vehicle longitudinal direction or in the vertical direction in longitudinal position adjustment and lift adjustment of the front seat 50, and the lap anchor 12 and the bracket 25 may be supported so as to be pivotable around the same axis 58.

Figure 12:
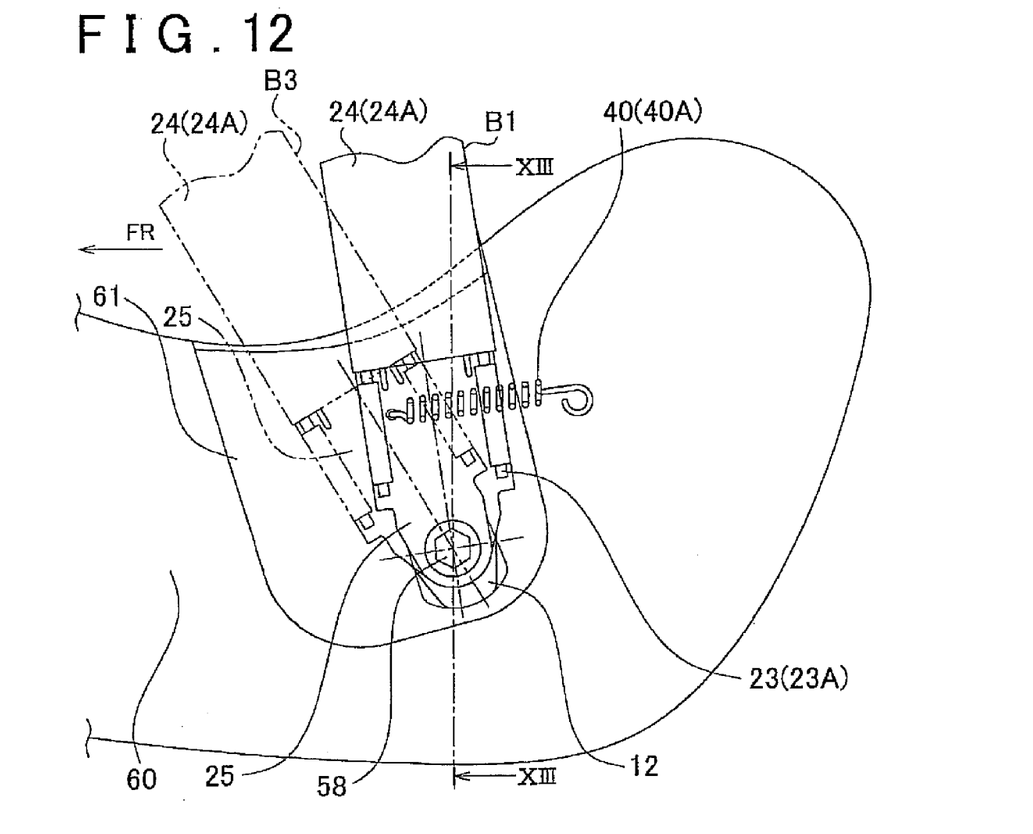
FIG. 12 is an enlarged side view of a portion of the bracket and lap anchor, coaxially coupled to a cushion frame, of the vehicle seat belt apparatus according to the second embodiment of the invention.

FIG. 12 and FIG. 13 show a structure that the lap anchor 12 and the bracket 25 are supported around the same axis. In FIG. 12, B1 indicates the seat belt retracted state, and B3 indicates a lap belt portion in a seat belt wearing state.

In FIG. 12 and FIG. 13, the lap anchor 12 is supported by the bolt 58 via a collar 59. The bracket 25 extends downward to the location of the bolt 58, and is supported by the bolt 58, The lap anchor 12 and the bracket 25 are supported by the bolt 58 at different locations in the bolt axial direction, and are pivotable around the bolt 58.

The operations and advantageous effects of the seat belt apparatus 10 according to the second embodiment of the invention will be described. When the lap anchor 12 is coupled to the cushion frame 54 so as to be pivotable in the vehicle longitudinal direction, the bracket 25 is supported by the cushion frame 54 so as to be pivotable in the vehicle longitudinal direction, so neither the relative longitudinal displacement nor the relative vertical displacement occurs between the pivot 58 of the lap anchor 12 and the bracket 25 in seat lift adjustment, and the bracket 25 and the lap anchor 12 may be supported on the same axis. By so doing, in comparison with the first embodiment, the bracket support structure may be simplified, and the number of components may be reduced.

What is claimed is:
1. A vehicle seat belt apparatus comprising:
a webbing;

a lap anchor that is connected to a vehicle member so as to pivot in a vehicle longitudinal direction, the lap anchor fixed to one end portion of the webbing;

a position retaining member that is located above the lap anchor, the position retaining member having an upper end portion and a lower end portion, the position retaining member allows the webbing to be slidably inserted therethrough, and the position retaining member is rigid in the vehicle longitudinal direction and is flexible and elastic in a vehicle transverse direction, the position retaining member extends obliquely forward and upward from the lower end portion and the upper end portion is located ahead of a side support of a seat back and above a seat shield in a seat belt retracted state;

an urging member that urges the position retaining member toward a vehicle rear side; and a stopper that limits rotation of the position retaining member such that the stopper retains the position retaining member in a position in which the position retaining member extends obliquely forward and upward from the lower end portion when in the seat belt retracted state.

2. The vehicle seat belt apparatus according to claim 1, wherein the position retaining member has a first member that is rigid in the vehicle longitudinal direction and is flexible and elastic in the vehicle transverse direction, a second member that covers the first member and that allows the webbing to be slidably inserted therethrough, and a bracket to which a lower end portion of the first member is fixed, and the first member is formed of an inverted U-shaped metal wire, and the inverted U-shaped metal wire is located in a plane that extends in the vehicle longitudinal direction.

3. The vehicle seat belt apparatus according to claim 2, wherein the second member is formed of a resin belt-like member that is flexible in the vehicle transverse direction.

4. The vehicle seat belt apparatus according to claim 2, wherein the second member is formed of a skin member with a fastener, and the position retaining member is separated from the webbing by opening the fastener.

5. The vehicle seat belt apparatus according to claim 2, wherein the vehicle member to which the lap anchor is connected so as to pivot in the vehicle longitudinal direction is a seat upper rail, and the bracket is supported by a seat shield cap so as to be slidably displaced in the vehicle longitudinal direction with respect to the seat shield cap, the seat shield cap being detachably connected to the seat shield so as to cover the bracket.

6. The vehicle seat belt apparatus according to claim 5, wherein the seat shield cap includes an upper cap slide rail and a lower cap slide rail that extends in the vehicle longitudinal direction, and wherein a protrusion extends from the bracket to slidable engage between the upper cap slide rail and the lower cap slide rail.

7. The vehicle seat belt apparatus according to claim 2, wherein the vehicle member to which the lap anchor is connected so as to pivot in the vehicle longitudinal direction is a cushion frame, and the lap anchor and the bracket each are coupled to the cushion frame so as to pivot in the vehicle longitudinal direction.

8. The vehicle seat belt apparatus according to claim 1, wherein the position retaining member has a first member that is rigid in the vehicle longitudinal direction and is flexible and elastic in the vehicle transverse direction, a second member that covers the first member and that allows the webbing to be slidably inserted therethrough, and a bracket to which a lower end portion of the first member is fixed, and the first member is formed of a narrow long metal member, and the metal member is located in a plane that extends in the vehicle longitudinal direction.

9. The vehicle seat belt apparatus according to claim 8, wherein the second member is formed of a resin belt-like member that is flexible in the vehicle transverse direction.

10. The vehicle seat belt apparatus according to claim 8, wherein the second member is formed of a skin member with a fastener, and the position retaining member is separated from the webbing by opening the fastener.

11. The vehicle seat belt apparatus according to claim 1, wherein the seat back has a first side and a second side, the first side of the seat back adapted to contact a back of an occupant, the second side being opposite from the first side, and the urging member urges the position retaining member toward the second side of the seat back.

* * * * *